Patented Feb. 5, 1935

1,989,681

UNITED STATES PATENT OFFICE 1,989,681

MOISTUREPROOF MATERIAL AND PROCESS OF MAKING SAME

William Hale Charch, Buffalo, N. Y., assignor, by mesne assignments, to Du Pont Cellophane Company, Inc., New York, N. Y., a corporation of Delaware No Drawing. Application February 21, 1929, Serial No. 341,834.

28 Claims. (Cl. 91—70)

This invention relates to moistureproof materials and the method of making same. More particularly, it relates to moistureproof sheets or films of regenerated cellulose and to the method of making the same. By the term "moistureproof" used herein, I mean the ability to resist the diffusion of water vapor to an extent at least as great as or exceeding that displayed by ordinary waxed papers employed as wrappers and functioning to resist the penetration of water vapor therethrough to a substantial degree for a substantial period of time, depending on the article being wrapped, and/or being approximately at least 7 times and preferably 10, 15, 20, 30, 50, 60, 80, 100 or more times as effective as uncoated sheets or films of regenerated cellulose when tested under the same conditions.

One of the most important uses of sheets of regenerated cellulose is to wrap various articles to produce attractive and ornamental packages. In the case of numerous articles such as bread, cake, tobacco products, candy and other products containing moisture, it is desirable to maintain the article in its relatively fresh and moist condition. Accordingly, it is necessary to treat the sheets or films of regenerated cellulose to prevent or resist the transmission or diffusion of water vapor or moisture therethrough, whereby the moisture content of the article wrapped is substantially retained. To attain this object sheets or films of regenerated cellulose have been treated so as to be rendered moistureproof. One of the methods used prior to this invention for rendering sheets or films of regenerated cellulose moistureproof comprised applying a moistureproofing composition including a cellulose derivative, a wax, a gum, a plasticizer and a solvent or solvent mixture and evaporating the solvent or solvent mixture, whereby a moistureproof material was produced. Another method comprised coating the sheets or films with a moistureproofing composition including a gum, a wax, a softening agent and a solvent, evaporating the solvent and subsequently applying a nitrocellulose lacquer, varnish or the like. The materials produced by the above methods were transparent, colorless, flexible, non-tacky and successfully resisted the transmission of moisture therethrough.

I have found that I can obtain a satisfactory material by impregnating sheets or films of regenerated cellulose in gel form with a moistureproofing composition comprising a wax and a plasticizer either in the form of a solution or dispersion, eliminating the liquid medium of said composition and subsequently coating said impregnated regenerated cellulose with shellac, varnish, lacquer or cellulose dope containing a cellulose derivative with or without plasticizers.

It is, therefore, an object of this invention to provide a method of treating sheets or films of regenerated cellulose to moistureproof the same.

Another object of the invention is to provide a method of moistureproofing sheets or films or regenerated cellulose starting with cellulose in gel form.

An additional object of this invention is to provide a method comprising impregnating sheets or films of regenerated cellulose with a moistureproofing composition and then applying a surface coating to prevent exudation of the ingredients of the moistureproofing composition, eliminate any undesirable tack and give it a more desirable surface feel and slip.

A further object of this invention is to provide a wrapping material comprising moistureproof sheets or films of regenerated cellulose, said sheets being impregnated with a moistureproofing composition.

A further object of this invention is to provide moistureproof sheets or films of regenerated cellulose, said sheets or films being impregnated with a moistureproofing composition and having a surface coating superimposed thereon.

A specific object of this invention is to provide sheets or films of regenerated cellulose impregnated with a moistureproofing composition comprising a wax and a plasticizer and having superimposed thereon a smooth, non-tacky, transparent coating.

Another specific object of this invention is to provide a moistureproof wrapping material comprising a sheet or film of regenerated cellulose impregnated with tricresyl phosphate and paraffin, and having a surface coating.

Further objects will appear from the following description and appended claims.

Broadly, the method constituting this invention comprises impregnating sheets or films of regenerated cellulose in a gel state with a moistureproofing composition either in the form of a solution or dispersion, eliminating the liquid medium of said composition, and then preferably applying a transparent surface coating to impart to the article a more desirable surface feel and slip and prevent exudation of the constituents of the moistureproofing composition.

Sheets or films of regenerated cellulose are manufactured by introducing an aqueous solution of viscose into a coagulating bath wherein the viscose is coagulated. The coagulated sheet or film is then transformed into cellulose, after which it is washed, desulfured, washed, bleached, again washed and finally dried. If the product is to be glycerinated, it is passed through an aqueous bath containing glycerin prior to drying.

In accordance with one method of practicing the invention, a sheet or film of regenerated cellulose in the gel state, that is, as it comes from the casting machine prior to glycerinating and before it is dried, may be used as the base. Such a sheet possesses a somewhat more open molecular or colloidal structure than one which has been submitted to a drying process. It, however, contains a large amount of water and/or moisture, which is undesirable. The water and/or moisture may be removed in various ways. I have found that I can substantially dehydrate the film by displacing the moisture or water with alcohol, acetone or other water-soluble organic solvent, which is miscible with hydrocarbons of the benzene or paraffin series. This initial treatment with alcohol or the like serves to remove the greater excess of adhering moisture or water. When this treatment is completed, the film or sheet is next treated with benzol, toluene, gasoline or cheap hydrocarbon solvent, whereby the alcohol or the like, remaining from the first treatment, is removed. These successive treatments serve to remove substantially all the water from said film and leave the film in a substantially dehydrated condition.

The substantially dehydrated sheet or film is then impregnated with a moistureproofing composition comprising a plasticizer, a wax and a solvent or solvent mixture as, for example, by immersion therein. It is to be understood that the moistureproofing composition may be applied in various other well-known ways and that the immersion operation above-described is merely for purposes of illustration. After subjecting the sheet or film to a moistureproofing composition, the surplus composition is removed in any well-known manner and the impregnated sheet is then dried at an elevated temperature, 50° C.–100° C., to evaporate the adherent hydrocarbon solvent.

Various compositions may be used for the moistureproofing composition. I have found that a moistureproofing composition comprising a plasticizer, a wax and a solvent produces satisfactory results. A moistureproofing composition comprising 200 parts of toluene or benzene, 20 parts of tricresyl phosphate and 1 part of high melting point paraffin has given satisfactory results. It is to be understood that various waxes, such as ceresin, beeswax, and the like may be used in place of the paraffin. Instead of tricresyl phosphate, there may be used any other softening agent among which may be mentioned oleic acid, dibutyl tartrate or other esters of tartaric acid, esters of phthalic acid, cetyl alcohol, camphor or in general any high boiling compound which is compatible with the wax employed and may be incorporated to an appreciable degree in sheets or films of regenerated cellulose. Any volatile solvent such as benzene, toluene, gasoline and the like, may be used to reduce the composition to a satisfactory liquid state.

At this stage of the process, the sheet or film of regenerated cellulose is substantially uniformly permeated and impregnated throughout its structure with the composition comprising the wax and plasticizer. It is moistureproof, flexible, odorless and transparent if the sheet or film of regenerated cellulose comprising the base is transparent. However, the material possesses an undesirable waxy or oily feel. It has also been found that material produced at this stage of the process, if exposed to high humidity, tends to absorb moisture from the atmosphere, thereby causing the plasticizer and wax to exude from the film and form an oily surface. To overcome these undesirable effects the impregnated material is coated with a solution which, upon drying, is smooth, transparent, odorless, flexible and does not in any way affect the desired characteristics of the impregnated film.

Various compositions may be used to attain this result. Dopes comprising nitrocellulose, cellulose acetate, cellulose ether, shellac solutions, ordinary transparent varnishes or lacquers, oils or the like with or without plasticizers may be used. This surface coating in no way affects the moistureproof property of the sheet or film. It, however, serves to give it a more desirable surface feel and slip and prevents the exudation of the wax and plasticizer with which the cellulose film has been impregnated before the application of the final surface coating.

The above method of impregnating the sheets or films of regenerated cellulose entails the use of rather expensive solvents. Another method of impregnating which eliminates the use of the expensive solvents comprises subjecting the film in gel state to a dispersion of wax and plasticizer. According to this procedure, the gel film at the stage just before it enters the drier is treated with a dispersion of wax and plasticizer. After this treatment the film is passed through the drier whereby the liquid medium is eliminated and the dispersion broken. After this procedure has been completed, it will be found that the film is impregnated with the wax and plasticizer. The impregnated film is then treated with a surface coating composition as above-described. This process may be carried out in the ordinary casting machine which is also an added advantage.

Various dispersions may be used to impregnate the gel film. The following is an example of a dispersion which has given satisfactory results:

To an emulsion formed by adding 20 parts by weight of tricresyl phosphate and 3 parts by weight of ammonium hydroxide to 200 parts of water heated to approximately 70° C. there is introduced a mixture of 1 part by weight of paraffin and 5 parts by weight of oleic acid previously heated to approximately 70° C. During the addition of the various materials, the mass is vigorously agitated whereby a dispersion capable of use as an impregnating medium is produced. In this dispersion the wax and plasticizer are in the dispersed phase, the water being in the continuous phase.

It is to be understood that the invention is not limited to the specific dispersion above-described. Waxes other than paraffin, plasticizers other than tricresyl phosphate, stabilizers other than oleic acid and salts thereof and liquids other than water as well as any other suitable proportion may be used.

The material produced by the methods herein described comprises a sheet or film of regenerated cellulose impregnated with a moistureproofing composition comprising a wax and a plasticizer and having a surface coating thereon. Due to the manner of carrying out the processes, if the sheet or film of regenerated cellulose is transparent, its transparency will in no way be impaired. The material may be transparent, flexible, colorless, odorless, tasteless and non-tacky, and it possesses sufficient moistureproofness so that, when it is used as a wrapping material, it will maintain the wrapped articles in their relatively fresh and moist condition.

I claim:

1. A method of preparing transparent and moistureproof sheet material which comprises impregnating a regenerated cellulose pellicle with a composition consisting essentially of a wax and a plasticizer in a liquid vehicle to moistureproof the same without substantially impairing the transparency of the ultimate product, and drying said impregnated material at an elevated temperature.

2. A method of preparing transparent and moistureproof sheet material which comprises impregnating a regenerated cellulose pellicle with a composition consisting essentially of a high melting point paraffin wax and a plasticizer in a liquid vehicle to moistureproof the same without substantially impairing the transparency of the ultimate product, and drying said impregnated material at an elevated temperature.

3. A method of preparing transparent and moistureproof sheet material which comprises impregnating a regenerated cellulose pellicle with an aqueous dispersion of a wax to moistureproof the same without substantially impairing the transparency of the ultimate product, and drying said impregnated material at an elevated temperature.

4. A method of preparing transparent and moistureproof sheet material which comprises impregnating a regenerated cellulose pellicle with an aqueous dispersion of a wax and a plasticizer to moistureproof the same without substantially impairing the transparency of the ultimate product, and drying said impregnated material at an elevated temperature.

5. A method of preparing transparent and moistureproof sheet material which comprises impregnating a regenerated cellulose pellicle in the gel state with an aqueous dispersion of a wax to moistureproof the same without substantially impairing the transparency of the ultimate product, and drying said impregnated material at an elevated temperature.

6. A method of preparing transparent and moistureproof sheet material which comprises impregnating a regenerated cellulose pellicle in the gel state with an aqueous dispersion of a wax and a plasticizer to moistureproof the same without substantially impairing the transparency of the ultimate product, and drying said impregnated material at an elevated temperature.

7. A method of preparing transparent and moistureproof sheet material which comprises removing the water from a regenerated cellulose pellicle in the gel state by solvent displacement, impregnating said pellicle with a composition consisting essentially of a wax and a plasticizer in a liquid vehicle to moistureproof the same without substantially impairing the transparency of the ultimate product, and drying said impregnated material at an elevated temperature.

8. A method of preparing transparent and moistureproof sheet material which comprises removing the water from a regenerated cellulose pellicle in the gel state by solvent displacement, impregnating said pellicle with a composition consisting essentially of a high melting point paraffin wax and a plasticizer to moistureproof the same without substantially impairing the transparency of the ultimate product, and drying said impregnated material at an elevated temperature.

9. A method of preparing transparent and moistureproof sheet material which comprises impregnating a regenerated cellulose pellicle with a composition consisting essentially of 1 part by weight of a wax and 20 parts by weight of a plasticizer in a liquid vehicle to moistureproof the same without substantially impairing the transparency of the ultimate product, and drying said impregnated material at an elevated temperature.

10. A method of preparing transparent and moistureproof sheet material which comprises impregnating a regenerated cellulose pellicle with a composition consisting essentially of a wax and a plasticizer in a liquid vehicle to moistureproof the same without substantially impairing the transparency of the ultimate product, drying said impregnated material at an elevated temperature, and applying a transparent non-tacky surface coating.

11. A method of preparing transparent and moisture-proof sheet material which comprises impregnating a regenerated cellulose pellicle with a composition consisting essentially of a high melting point paraffin wax and a plasticizer in a liquid vehicle to moistureproof the same without substantially impairing the transparency of the ultimate product, drying said impregnated material at an elevated temperature, and applying a transparent non-tacky surface coating.

12. A method of preparing transparent and moistureproof sheet material which comprises impregnating a regenerated cellulose pellicle with an aqueous dispersion of a wax to moistureproof the same without substantially impairing the transparency of the ultimate product, drying said impregnated material at an elevated temperature, and applying a transparent non-tacky surface coating.

13. A method of preparing transparent and moistureproof sheet material which comprises impregnating a regenerated cellulose pellicle with an aqueous dispersion of a wax and a plasticizer to moistureproof the same without substantially impairing the transparency of the ultimate product, drying said impregnated material at an elevated temperature, and applying a transparent non-tacky surface coating.

14. A method of preparing transparent and moistureproof sheet material which comprises impregnating a regenerated cellulose pellicle in the gel state with an aqueous dispersion of a wax to moistureproof the same without substantially impairing the transparency of the ultimate product, drying said impregnated material at an elevated temperature, and applying a transparent non-tacky surface coating.

15. A method of preparing transparent and moistureproof sheet material which comprises impregnating a regenerated cellulose pellicle in the gel state with an aqueous dispersion of a wax and a plasticizer to moistureproof the same without substantially impairing the transparency of the ultimate product, drying said impregnated material at an elevated temperature, and applying a transparent non-tacky surface coating.

16. A method of preparing transparent and moistureproof sheet material which comprises removing the water from a regenerated cellulose pellicle in the gel state by solvent displacement, impregnating said pellicle with a composition consisting essentially of a wax and a plasticizer in a liquid vehicle to moistureproof the same without substantially impairing the transparency of the ultimate product, drying said impregnated material at an elevated temperature, and applying a transparent non-tacky surface coating.

17. A method of preparing transparent and moistureproof sheet material which comprises removing the water from a regenerated cellulose pellicle in the gel state by solvent displacement, impregnating said pellicle with a composition consisting essentially of a high melting point paraffin wax and a plasticizer to moistureproof the same without substantially impairing the transparency of the ultimate product, drying said impregnated material at an elevated temperature, and applying a transparent non-tacky surface coating.

18. A method of preparing transparent and moistureproof sheet material which comprises impregnating a regenerated cellulose pellicle with a composition consisting essentially of 1 part by weight of a wax and 20 parts by weight of a plasticizer in a liquid vehicle to moistureproof the same without substantially impairing the transparency of the ultimate product, drying said impregnated material at an elevated temperature, and applying a transparent non-tacky surface coating.

19. A transparent moistureproof article of manufacture suitable for use as a wrapping tissue comprising regenerated cellulose sheeting impregnated with a composition consisting essentially of a wax and a plasticizer which moistureproofs the regenerated cellulose sheeting and does not impair the transparency of the ultimate product.

20. A transparent moistureproof article of manufacture suitable for use as a wrapping tissue comprising regenerated cellulose sheeting impregnated with a composition consisting essentially of a high melting point paraffin wax and a plasticizer which moistureproofs the regenerated cellulose sheeting and does not impair the transparency of the ultimate product.

21. A transparent moistureproof article of manufacture suitable for use as a wrapping tissue comprising regenerated cellulose sheeting impregnated with a composition consisting essentially of 1 part by weight of wax and 20 parts by weight of a plasticizer which moistureproofs the regenerated cellulose sheeting and does not impair the transparency of the ultimate product.

22. A transparent moistureproof article of manufacture suitable for use as a wrapping tissue comprising regenerated cellulose sheeting impregnated with a composition consisting essentially of a wax and a plasticizer which moistureproofs the regenerated cellulose sheeting and does not impair the transparency of the ultimate product, and having a transparent non-tacky surface coating.

23. A transparent moistureproof article of manufacture suitable for use as a wrapping tissue comprising regenerated cellulose sheeting impregnated with a composition consisting essentially of a high melting point paraffin wax and a plasticizer which moistureproofs the regenerated cellulose sheeting and does not impair the transparency of the ultimate product, and having a transparent non-tacky surface coating.

24. A transparent moistureproof article of manufacture suitable for use as a wrapping tissue comprising regenerated cellulose sheeting impregnated with a composition consisting essentially of 1 part by weight of a wax and 20 parts by weight of a plasticizer which moistureproofs the regenerated cellulose sheeting and does not impair the transparency of the ultimate product, and having a transparent non-tacky surface coating.

25. A method of preparing a transparent and moistureproof sheet material which comprises impregnating a regenerated cellulose pellicle with a composition consisting essentially of a paraffin wax and tricresyl phosphate in a liquid vehicle to moistureproof said regenerated cellulose pellicle without impairing the transparency of the final product, drying the impregnated material at an elevated temperature and applying a transparent non-tacky surface coating.

26. A method of preparing a transparent and moistureproof sheet material which comprises impregnating a regenerated cellulose pellicle in the gel state with an aqueous dispersion of a high melting point paraffin wax and tricresyl phosphate to moistureproof said regenerated cellulose pellicle without impairing the transparency of the final product, drying the impregnated material at an elevated temperature and applying a transparent non-tacky surface coating.

27. A method of preparing a transparent and moistureproof sheet material which comprises impregnating a regenerated cellulose pellicle in the gel state with an aqueous dispersion containing 1 part by weight of paraffin and 20 parts by weight of tricresyl phosphate to moistureproof said regenerated cellulose pellicle without impairing the transparency of the final product, drying the impregnated material at an elevated temperature and applying a transparent non-tacky surface coating.

28. A transparent moistureproof article of manufacture suitable for use as a wrapping tissue comprising regenerated cellulose sheeting impregnated with a composition consisting essentially of 1 part by weight of a high melting point paraffin wax and 20 parts by weight of tricresyl phosphate which moistureproofs the regenerated cellulose sheeting and does not impair the transparency of the ultimate product, and having a transparent non-tacky surface coating.

WILLIAM HALE CHARCH.